United States Patent [19]
McDonnell et al.

[11] Patent Number: 5,862,494
[45] Date of Patent: Jan. 19, 1999

[54] METHOD FOR ENTRAPPING AND MINIMIZING MOISTURE BEARING LOW-LEVEL RADIOACTIVE AND MIXED WASTE MATERIAL

[76] Inventors: John E. McDonnell, Rte. 5, Box 269F; Billy A. Reynolds, 1512 W. Lake Dr., both of Johnson City, Tenn. 37601

[21] Appl. No.: 707,148

[22] Filed: Sep. 3, 1996

[51] Int. Cl.⁶ .................................................... G21F 9/00
[52] U.S. Cl. .................................................. 588/6; 588/255
[58] Field of Search ........................ 588/6, 255; 422/295, 422/296; 210/660; 134/7; 405/128; 502/401

[56] References Cited

U.S. PATENT DOCUMENTS

| | | |
|---|---|---|
| 4,156,658 | 5/1979 | Mercer, Jr. et al. . |
| 4,383,868 | 5/1983 | Braley ........................................... 134/7 |
| 4,749,600 | 6/1988 | Cullen et al. . |
| 4,770,715 | 9/1988 | Mandel et al. ............................. 134/40 |
| 4,790,688 | 12/1988 | Castor ...................................... 405/128 |
| 4,876,036 | 10/1989 | Candau et al. . |
| 4,913,835 | 4/1990 | Mandel et al. . |
| 5,091,443 | 2/1992 | Karakelle et al. . |
| 5,092,858 | 3/1992 | Benson et al. . |
| 5,422,330 | 6/1995 | Kaylor ..................................... 502/402 |

FOREIGN PATENT DOCUMENTS 360165600  8/1985  Japan .

*Primary Examiner*—Ngoclan Mai
*Attorney, Agent, or Firm*—Baker, Donelson, Bearman & Caldwell

[57] ABSTRACT

The present invention provides an encapment process for rapidly stabilizing and substantially reducing the volume of moisture bearing radioactive and mixed hazardous waste materials. The present process effectively utilizes polyacrylate encapsulating material in combination with equipment or systems which deliver the encapsulates to the waste material being processed. The polyacrylates may be dispersed from a pressurized vessel to stop leaks and spills, added to solid waste material to produce waste material which has no free standing liquids, or added to liquid waste material and dried to significantly reduce the volume of the waste material and produce a waste product having no free standing liquids.

3 Claims, 3 Drawing Sheets

METHOD FOR ENTRAPPING AND MINIMIZING MOISTURE BEARING LOW-LEVEL RADIOACTIVE AND MIXED WASTE MATERIAL

This is a provisional application of Ser. No. 60/003,115, filed Sep. 1, 1995.

BACKGROUND OF THE INVENTION

The present invention relates to a method for the entrapment and minimization of hazardous moisture bearing waste material, and more specifically, to a method for entrapping the hazardous components of moisture bearing low-level radioactive and mixed waste material and substantially reducing the volume of hazardous aqueous radioactive and mixed waste material.

Various types of sorbent material are used for spill control and in the packaging of liquids, sludges, and other moisture-bearing low-level radioactive and mixed waste material. Mixed waste material is defined as waste containing both radioactive and hazardous components as defined by the Atomic Energy Act (ATEA) and the Resource Conservation and Recovery Act (RCRA). Low level waste is generally defined as waste that contains radioactivity and is not classified as high-level waste, transuranic waste ("TRU"), or spent nuclear fuel. The choice of acceptable sorbent material depends upon the characteristics and the manner of disposing of the waste material. Sorbents, such as loose clay chips, mineral silica, vermiculite, and diatomaceous earth have been used in the industry for a long time. Although relatively inexpensive, some mineral type sorbents absorb only 10 to 15 percent by weight. Many mineral sorbents are very heavy and considerably increase the volume of solid waste which must be stored or buried at designated sites that are rapidly being filled by the ever increasing volume of waste material generated each year. Other sorbents, such as vermiculite, are highly absorbent but much more compressible, making it unsuitable when compression loads must be considered. Moreover, the use of mineral sorbents is labor intensive and often creates dust problems which enhance the risk associated with handling hazardous waste materials. Cellulose and wood based sorbents, such as cotton fiber, sawdust, wood pulp, corn cob centers and other biodegradable materials, are very combustible and are suitable where the primary means of disposal is incineration. However, biodegradable sorbents may be banned from hazardous based landfills because of the potential release of dangerous chemicals to the environment.

One of the most promising materials available today for aqueous based moisture bearing wastes are the polymer sorbents known as polyacrylates. Polyacrylate sorbents are non-biodegradable, lightweight, low volume, and are incinerable. Polyacrylates are generally available in granulated or powder forms which are activated by the water in the waste material. The polyacrylates chemically bind the liquids to the polymer molecules to form new molecules as a matrix which can hold the liquid in a very stable gel-like matrix at significantly higher pressures. Polyacrylates have a very high liquid to sorbent ratio, often up to a 200 to 1 ratio. Some polyacrylates react with remarkable speed to encapsulate and retain the hazardous component of the waste material within the matrix. However, until now, no effective devices or systems have been developed which offer the benefits of polyacrylate sorbents for wide-spread use in hazardous waste clean-up and disposal operations, and particularly for radioactive waste entrapment and minimization.

In view of the foregoing, a need exists for a device and system for delivering polyacrylate sorbent material to hazardous waste spills and leaks so that the waste is contained quickly and safely. A further need exists for a system of treating contaminated soil and other moisture bearing waste material which significantly reduces the moisture content and provides a solid waste material having no free standing liquids. A need also exists for a system which stabilizes large volumes of aqueous radioactive waste material and substantially reduces the volume of the waste material to be buried or stored at waste disposal sites.

SUMMARY OF THE INVENTION

These and other needs are satisfied by the present invention which provides an encapment process for rapidly stabilizing and substantially reducing the volume of moisture bearing hazardous waste materials in a variety of applications. The encapment process effectively utilizes encapsulating material in combination with equipment or systems which deliver the encapsulates to the waste material being processed. The hazardous waste may be radioactive, non-radioactive or mixed waste material.

The encapsulates are preferably chosen from polyacrylic acids and all salts thereof. Polyacrylates are particularly preferred as the encapsulating material used in the encapment process of the present invention. The encapsulating material is typically in a powder or granular form. When added to a moisture bearing waste product, the encapsulates react with the moisture in the waste material to form a stable gel-like matrix.

In one embodiment of the present method, pressurized vessels are filled with polyacrylate encapsulates for use in containing hazardous aqueous based spills or leaks. The vessel may be any type of container which is designed to expel its contents under pressure from a gas or other substance, and may range in size from small aerosol containers to large commercial or industrial pressurized tanks. The pressurized vessel containment system expels the encapsulates directly onto the hazardous liquid to quickly stop the flow and contain the spill. The pressurized vessels may also be used to build dikes or barriers with polyacrylates which rapidly contain spilled or leaking radioactive liquid waste material in an isolated area. The pressurized encapsulate dispensing devices of the present invention are particularly useful for relatively small emergency containment applications. However, the pressurized vessel containment system also may be configured for large storage area applications as well.

In another embodiment of the present invention, a system is provided which blends the polyacrylate sorbent material with soils, sludges or other moisture bearing solid waste material. The system includes a component for adding the polyacrylate sorbent to the solid waste at a predetermined rate and a fuser for homogeneously mixing the polyacrylate sorbent with the contaminated solid waste.

In yet another embodiment of the present invention, a system is provided which includes a device for delivering the polyacrylate sorbent to the liquid waste material to encapsulate and retain the hazardous components of the waste in a stable gel-like matrix.

A flash evaporator, industrial microwave device, or other means is then used to rapidly reduce the moisture content of the gel. After substantially all of the moisture is removed from the gel, the waste material is in the form of a crusty ash-like material which retains the radioactive contaminants within the gel matrix. The waste minimization process of the present invention reduces the final volume of aqueous waste material by up to 99% in a safe, self-contained system. The system may be either permanently installed in a manufacturing facility or other waste generating site for ongoing treatment of hazardous liquid waste material, or the system may be provided as a mobile waste treatment system which can be moved to various locations for short term or smaller waste treatment projects. The waste minimization process is particularly useful for the safe and cost effective disposal of nuclear waste material.

The encapment process of the present invention may also include the use of pads, bags or socks filled with encapsulating material. The pads may be manufactured in a variety of shapes and sizes as required by a particular application. The pads are used alone or in combination with any of the systems of the present invention. For example, the pads may be placed inside, under, or around containers of nuclear waste to absorb condensation or provide additional protection from leaks or spills.

BRIEF DESCRIPTION OF THE DRAWINGS

These and other features, aspects, and advantages of the present invention will become better understood when referring to the following description, appended claims, and accompanying drawings where:

DETAILED DESCRIPTION OF THE INVENTION

The encapsulating material used in the hazardous waste treatment systems of the present invention includes polyacrylic acids and all salts thereof. The encapsulates are typically utilized in powder or granular form. When added to a moisture bearing waste product, the encapsulates react with the moisture in the waste material to form a stable gel-like matrix. The liquids in the waste material are entrapped within the matrix and the waste material is left with no free standing liquids. The particular encapsulate used in a hazardous waste treatment system is selected according to the characteristics of the waste material being processed. The encapsulates used in the encapment process of the present invention preferably are non-biodegradable, non-toxic, incinerable materials which retain many times their own weight in moisture at elevated pressures. The encapsulates also are preferably compatible with most chemicals and are effective at a wide pH range and a wide temperature range. It is desirable that the encapsulates be transparent so that the waste material containing the encapsulates may be X-rayed using Real Time Radiography techniques required by many regulated disposal sites. Suitable encapsulates for use in the encapment process of the present invention include polyacrylates sold under the tradename ECsorb by Technical Solutions & Systems, 328 East Elk Avenue, Elizabethton, Tenn. 37643.

Figure 1:
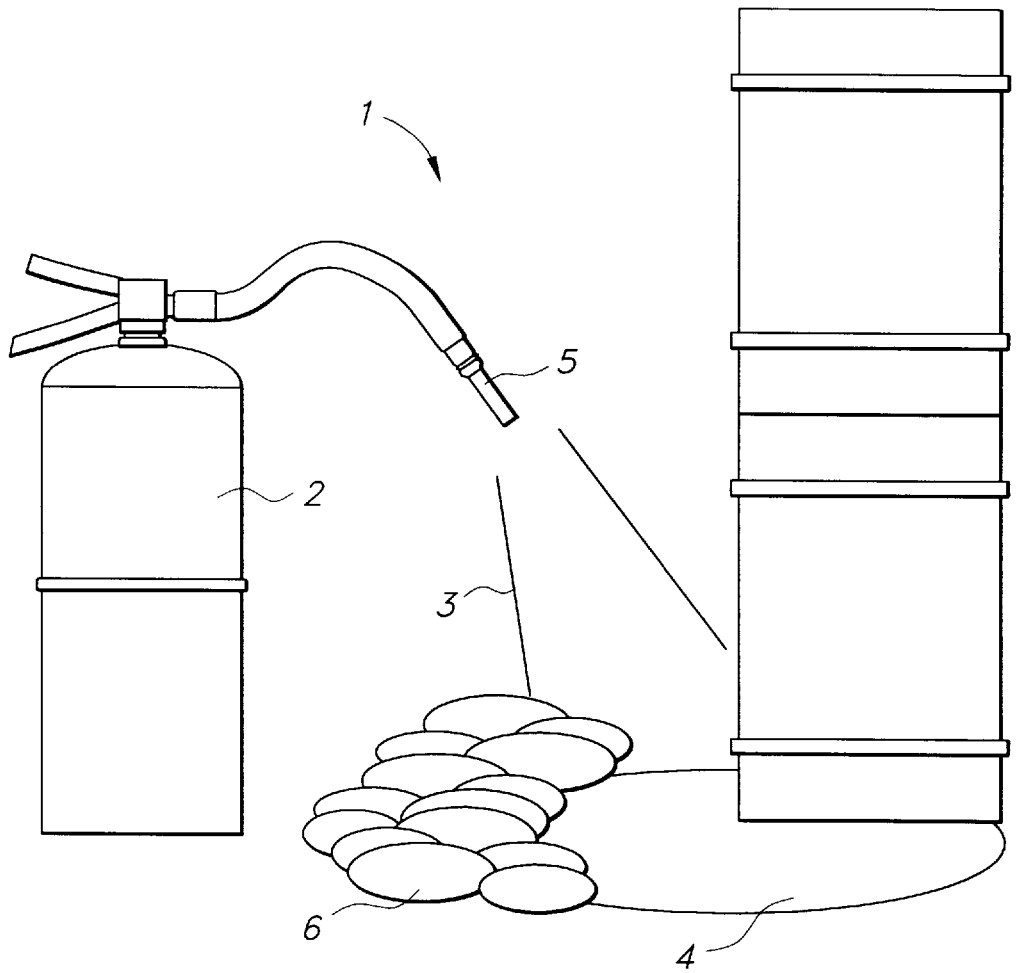
FIG. 1 is a perspective view embodying features of the pressurized containment system of the present invention.

Referring now to FIG. 1, there is shown the pressurized vessel containment system of the present invention, designated generally as 1, wherein a pressurized vessel or tank 2 is filled with encapsulating material 3 for dispensing directly onto the hazardous waste 4. The pressurized tank 2 may be any vessel designed to dispense its contents under pressure from a gas or other suitable propellent. The pressurized tank 2 may range in size from small aerosol-type cans to large commercial or industrial sized tanks. The pressurized containment system 1 is particularly useful for controlling leaks and spills of low-level radioactive and mixed moisture bearing waste material. The nozzle 5 on the tank 2 is pointed at the leaking waste material 4 and the encapsulating material 3 is dispensed directly into the hazardous waste 4. Within seconds, the encapsulating material 3 reacts with the moisture in the waste material 4 to form a stable gel-like matrix 6, preventing any further flow of the waste 4. The gel-like matrix can then be disposed of in a safe and suitable manner. In addition, the pressurized containment system 1 can be used to form dikes or barriers which contain larger volumes of waste material until appropriate clean-up measures can be implemented.

Figure 2:
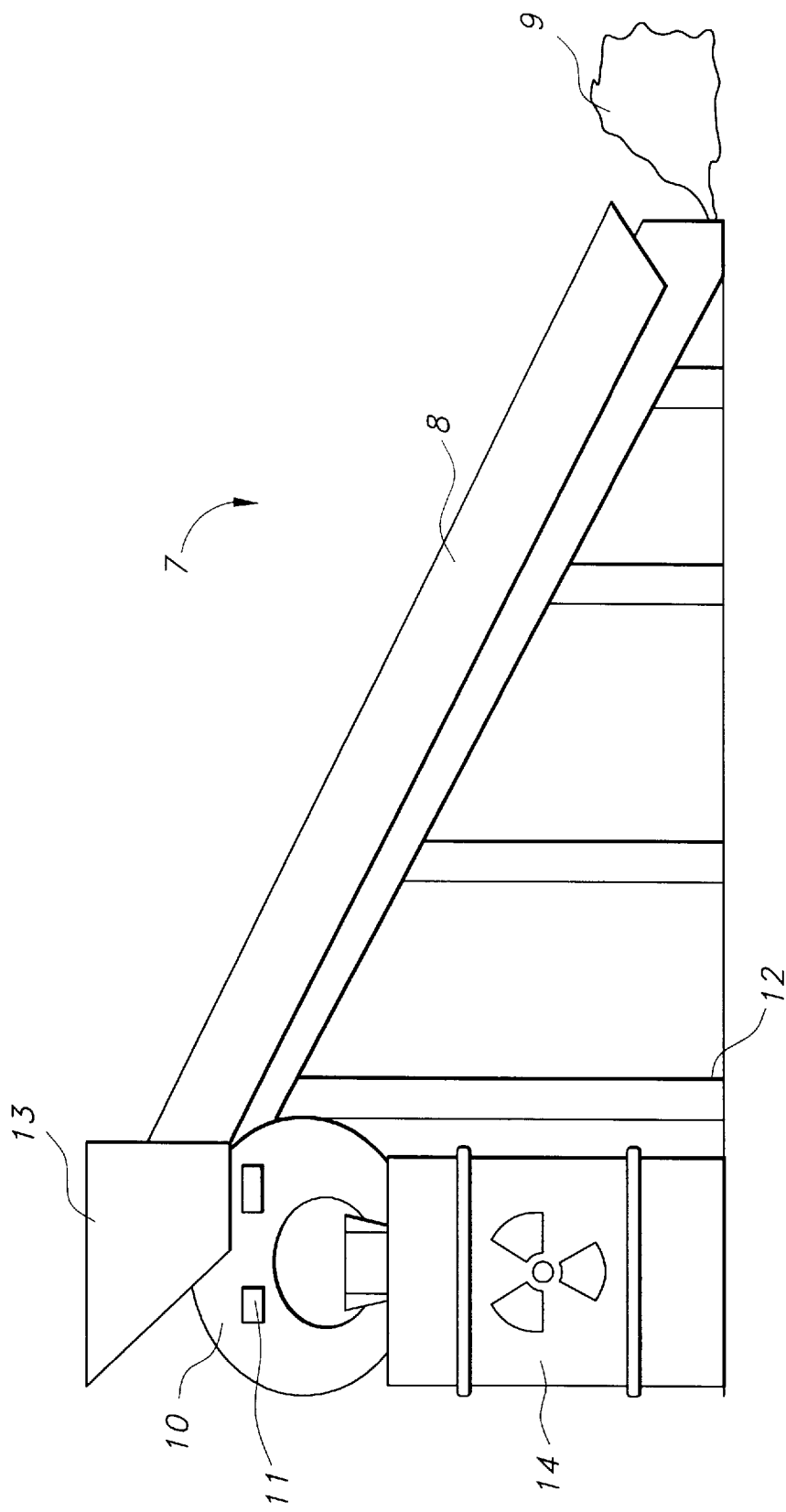
FIG. 2 is a side view embodying features of the solid waste treatment system of the system of the present invention.

As shown in FIG. 2, the solid waste treatment system of the present invention, designated generally as 7, includes a conveyor 8 for transporting solid waste material 9 to a fuser 10. The conveyor 8 may be a belt conveyor, a screw auger, or any other suitable means for transporting the solid waste 9 into the fuser 10. The fuser 10 is preferably a commercial mixer which is provided with a high speed rotary hammer. In a particularly preferred embodiment, the high speed rotary hammer rotates at a minimum speed of 2500 rpm, and more preferably at a speed of 3500 rpm. However, any means for breaking up the solid waste 9 and blending the solid waste 9 with the encapsulating material 3 is suitable for use in the fuser 10. The fuser 10 may be a portable unit which can be transported to the solid waste clean-up site. The fuser 10 also is preferably provided with load cells 12 or other means for weighing the solid waste 9 within the fuser 10. When utilized for treating radioactive solid waste material, the fuser 10 is preferably provided with detectors 11 to monitor the level of radioactivity within the fuser 10. The detectors 11 may be a germanium detector a passive/active neutron measuring device or any other suitable means for monitoring the level of radioactivity within the fuser 10.

In a typical application, the solid waste treatment system 7 is assembled at a contaminated soil clean-up site. The soil 9 is tested for moisture content and levels of hazardous contaminants to determine the appropriate amount of encapsulating material 3 to add to the soil 9. The solid moisture bearing soil waste 9 is transported on the conveyor 8 through hopper 13 into the fuser 10. A predetermined amount of encapsulating material 3 is added to the fuser 10. The amount of the encapsulating material 3 is determined by the moisture content of the soil, as well as government regulations regarding radioactive and hazardous waste disposal. The fuser 10 is started and the solid waste 9 and the encapsulating material 3 are blended until the encapsulating material 3 and the solid waste 9 form a homogenous mixture. The soil waste 9 entering the fuser is generally soft and moist in appearance. Some soil wastes may even be in the form of a slurry. The encapsulating material 3 reacts with the moisture in the soil waste 9 to form stable gel-like matrix. Upon completion of the blending operation, the solid waste 9 has a granular appearance similar to grainy sand. The treated solid waste material 9 then is placed in appropriate storage containers 14 for hazardous waste disposal. The solid waste 9 is processed in the fuser 10 in individual batches until all of the contaminated solid waste 9 has been treated and sealed in containers 14. After treatment with the solid waste treatment system 7 of the present invention, the waste material is tested by the paint filter test or the Environmental Protection Agency ("EPA") Method 9095.

Upon completion of the encapment process, the solid waste material 9 meets all current waste acceptance criteria for no free standing liquids.

Figure 3:
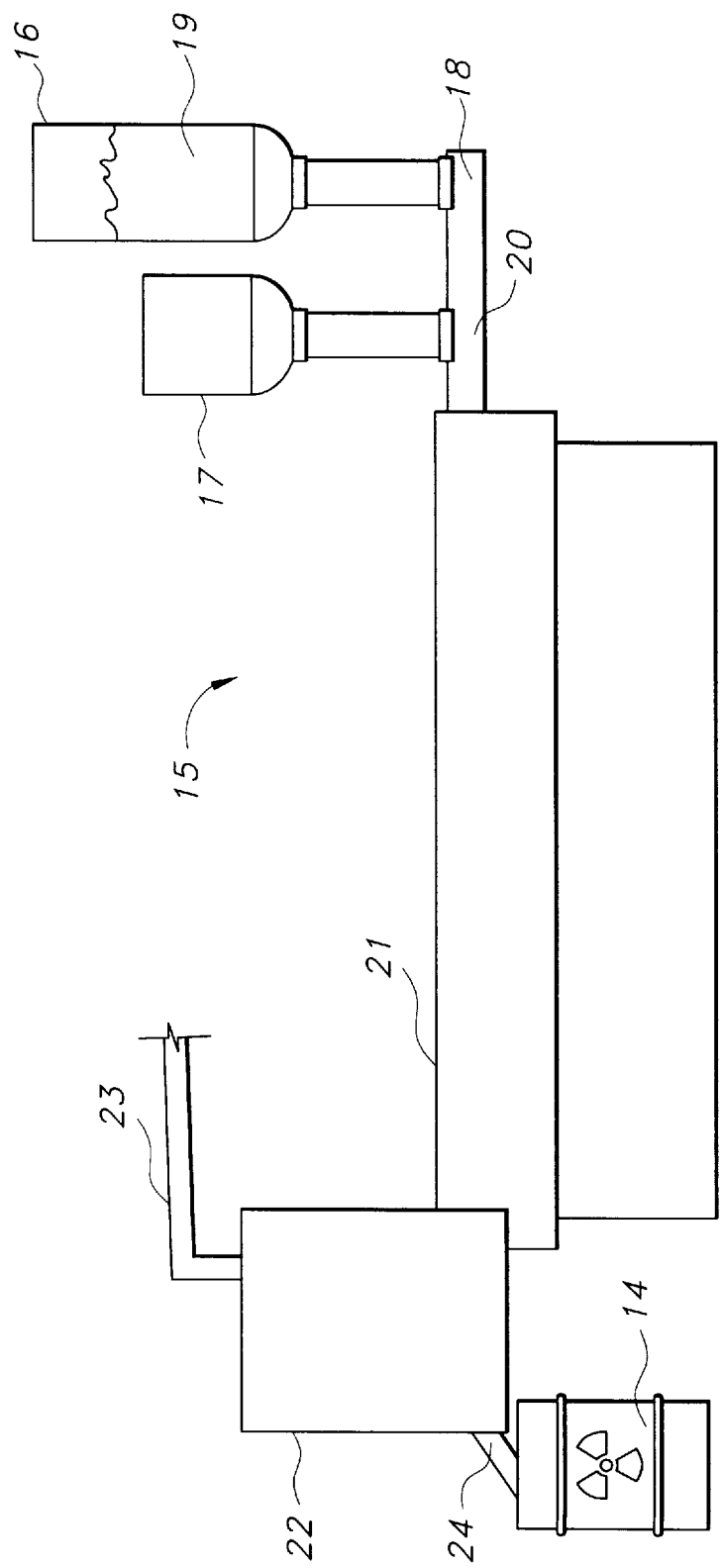
FIG. 3 is a flow diagram illustrating features of the liquid waste minimization system of the present invention.

As shown in FIG. 3, the encapment process of the present invention also includes an aqueous liquid waste minimization system, designated generally as 15. The waste minimization system 15 includes a liquid waste tank 16 and an encapsulate tank 17. Both the liquid waste tank 16 and the encapsulate tank 17 empty into a pipe 18 which transports a predetermined amount of liquid waste 19 and encapsulating material 3 to an in-line mixer 20. The mixer 20 may be a ribbon mixer or any other suitable means for blending and mixing the encapsulating material 3 with the liquid waste 19 until the mixture forms a gel-like matrix. In a preferred embodiment, the gel-like mixture of liquid waste 19 and encapsulating material 3 is transported through an enclosed conveyor 21 and into an evaporator 22 or other suitable means for removing the moisture from the gel-like matrix. Discharge pipe 23 or other suitable means for removing the vapor or distillate from the evaporator 22 is provided on evaporator 22. An outlet port 24 is provided on the evaporator 22 for removing the processed waste material. Preferably, the outlet port 24 empties directly into an appropriate hazardous waste container 14. The liquid waste minimization system 15 also may be provided with a temperature control panel not shown detectors not shown for monitoring the level of radioactivity in the waste material, load cells (not shown) or other means for weighing the materials being processed, and an automated control system for regulating the operation of the system 17. The liquid waste minimization system 15 may be configured as a permanent installation for continuously processing liquid waste material in an industrial setting or as a mobile unit for processing liquid waste material at various locations.

In a typical application, radioactive liquid waste 19 is tested for levels of contaminants. After determining the appropriate amount and type of encapsulating material 3 to add to the liquid waste 19, the liquid waste 19 is pumped into the liquid waste tank 16. As the liquid waste 19 travels through pipe 18, the encapsulating material 3 is added to the liquid waste 19 in pipe 18. The mixture is transported through the in-line mixer 20 which blends the encapsulating material 3 with the liquid waste 19 to form a gel-like matrix. The gel-like matrix is transported through the enclosed conveyor 21 to the evaporator 22 which removes substantially all of the moisture from the gel-like matrix. The vapor or distillate is removed from the evaporator 22 through discharge pipe 23. Substantially all of the radioactive contaminants in the liquid waste material are entrapped in the remaining matrix material, which is now in the form of a crusty ash-like material. The volume of remaining matrix material is generally about 50% to about 90% less than the original volume of liquid waste 19 prior to treatment by the liquid waste minimization process. Since substantially all of radioactive contaminants are entrapped in the matrix material, the distillate is generally free of any significant levels of radioactive contaminants. The distillate can then be disposed of by depositing in waste streams or other waste disposal methods for non-hazardous waste material. In the event the distillate contains higher levels of contaminants, the distillate can be recycled through the liquid waste minimization system 15 or disposed of in less costly disposal sites for lower level contaminated waste material.

Although the invention is described with respect to the preferred embodiments, it is expected that various modifications may be made thereto without departing from the spirit and scope of the invention. Therefore, the scope of the invention is to be determined by reference to the claims which follow.

We claim:

1. A method of entrapping the hazardous components of moisture-bearing low-level radioactive and mixed waste material which comprises the steps of:

selecting an encapsulating material from the group consisting of polyacrylic acids and the salts thereof;

determining the amount of encapsulating material which is required to form a gel-like matrix with the waste material; and blending the encapsulating material with the moisture-bearing waste material to react the encapsulating material with the moisture in the waste material until a gel-like matrix is formed which entraps the hazardous components of the waste material and provides a final waste material product having no freestanding liquids.

2. A method according to claim 1 wherein the encapsulating material selected is polyacrylate.

3. A method according to claim 1 wherein said encapsulating material is placed within a pressurized vessel and blended with said moisture-bearing waste material by being discharged from the vessel into the moisture-bearing waste material.

* * * * *